US012586847B2

(12) United States Patent
Nishibu et al.

(10) Patent No.: US 12,586,847 B2
(45) Date of Patent: Mar. 24, 2026

(54) BATTERY AND METHOD FOR PRODUCING THEREOF

(71) Applicant: TOYOTA JIDOSHA KABUSHIKI KAISHA, Toyota (JP)

(72) Inventors: Yuki Nishibu, Seto (JP); Takamasa Maeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 704 days.

(21) Appl. No.: 17/860,365

(22) Filed: Jul. 8, 2022

(65) Prior Publication Data

US 2023/0017625 A1 Jan. 19, 2023

(30) Foreign Application Priority Data

Jul. 19, 2021 (JP) .................................. 2021-118611

(51) Int. Cl.
| | |
|---|---|
| *H01M 50/183* | (2021.01) |
| *H01M 10/0585* | (2010.01) |
| *H01M 50/102* | (2021.01) |
| *H01M 50/14* | (2021.01) |
| *H01M 50/533* | (2021.01) |

(52) U.S. Cl.
CPC ..... *H01M 50/183* (2021.01); *H01M 10/0585* (2013.01); *H01M 50/102* (2021.01); *H01M 50/14* (2021.01); *H01M 50/533* (2021.01)

(58) Field of Classification Search
CPC ... H01M 50/183; H01M 50/14; H01M 50/105
See application file for complete search history.

(56) References Cited

U.S. PATENT DOCUMENTS

| | | | |
|---|---|---|---|
| 2008/0171259 A1 | 7/2008 | Kanai et al. | |
| 2016/0155997 A1* | 6/2016 | Yi ..................... | H01M 10/0436 |
| | | | 429/153 |
| 2017/0170437 A1* | 6/2017 | Lee ..................... | H01M 50/184 |
| 2018/0233711 A1 | 8/2018 | Kato | |
| 2019/0348647 A1* | 11/2019 | Kawai ................. | H01M 50/103 |
| 2020/0119363 A1* | 4/2020 | Honda ............... | H01M 50/204 |
| 2022/0013843 A1* | 1/2022 | Fukuda ............... | H01M 50/184 |

FOREIGN PATENT DOCUMENTS

| | | | | |
|---|---|---|---|---|
| JP | 2012243556 A | * 12/2012 | ............. | Y02P 70/50 |
| JP | 2018-133175 A | 8/2018 | | |
| WO | 2005/096412 A1 | 10/2005 | | |
| WO | 2018/180152 A1 | 10/2018 | | |

* cited by examiner

*Primary Examiner* — Maria Laios
*Assistant Examiner* — Benjamin T Lustgraaf
(74) *Attorney, Agent, or Firm* — Dinsmore & Shohl LLP

(57) ABSTRACT

A main object of the present disclosure is to provide a battery in which wrinkles in its outer package is prevented from generating. The present disclosure achieves the object by providing a battery including: an internal element including at least a power generating element, and a laminate-type outer package in which the internal element is sealed; wherein the internal element includes a groove structure; and the battery includes a storing part where a part of the outer package is stored in the groove structure.

8 Claims, 6 Drawing Sheets

FIG. 8A
FIG. 8B
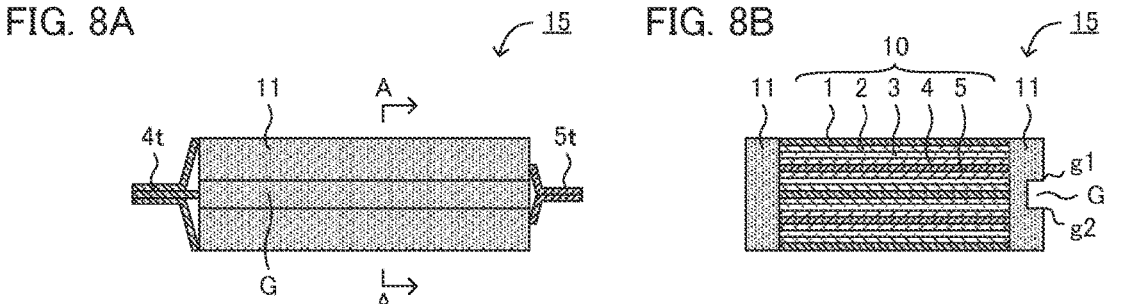
FIG. 9A
FIG. 9B
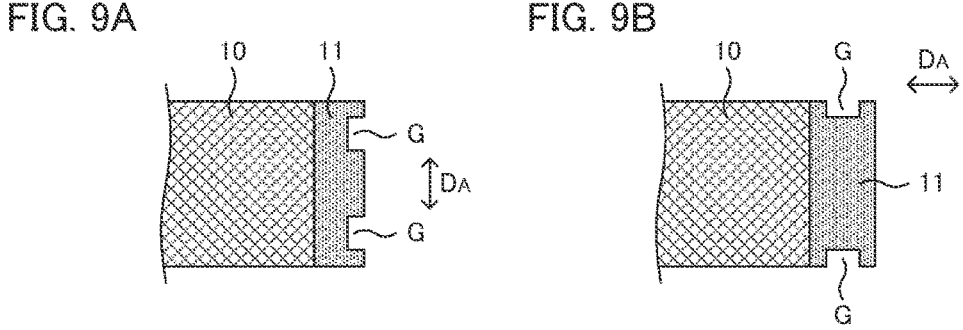
FIG. 10
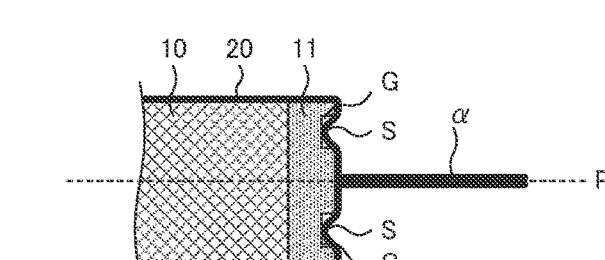

FIG. 11A
FIG. 11B
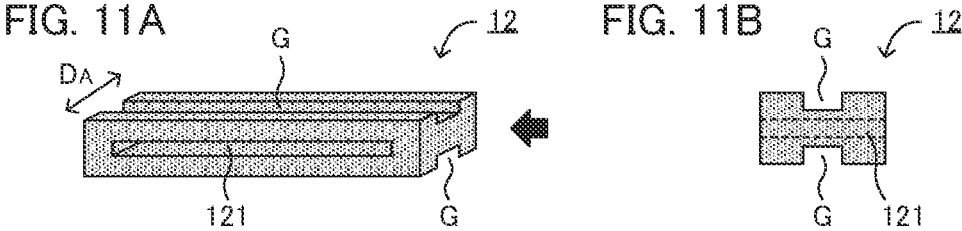
FIG. 12
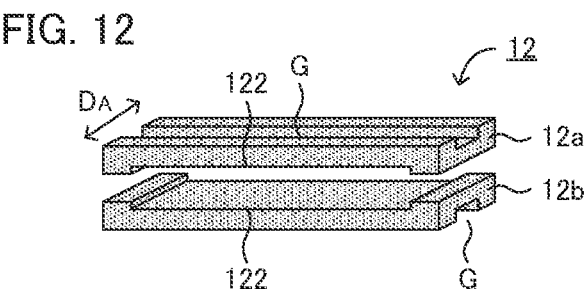
FIG. 13
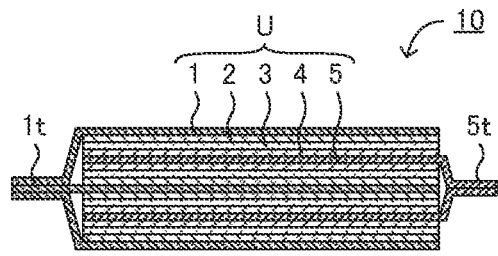

FIG. 14A
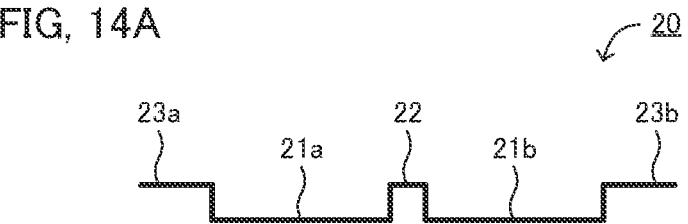
FIG. 14B
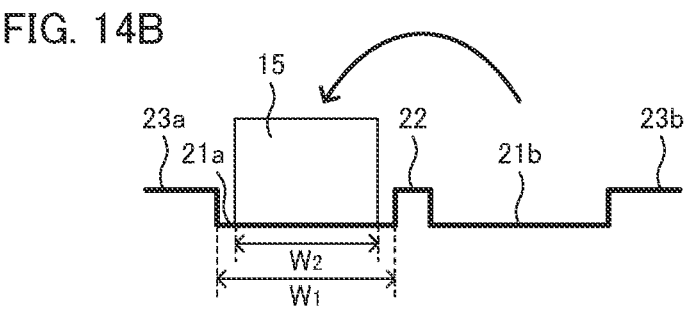
FIG. 15A
FIG. 15B
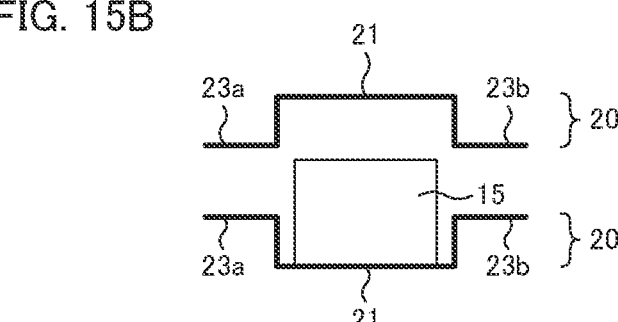

BATTERY AND METHOD FOR PRODUCING THEREOF

CROSS-REFERENCE TO RELATED APPLICATIONS

This application is based upon and claims the benefit of priority of the prior Japanese Patent Application No. 2021-118611 filed Jul. 19, 2021, the entire contents of which are incorporated herein by reference.

TECHNICAL FIELD

The present disclosure relates to a battery and a method for producing thereof.

BACKGROUND

In recent years, as high-voltage and high-energy density batteries, lithium ion batteries have been put into practical use. Also, as one of the embodiments of such batteries, it has been known that there is a laminate battery in which an internal element including a power generating element is sealed by a laminate-type outer package. For example, Patent Literature 1 discloses a method for producing a laminate all solid state battery, the method including storing an all solid battery layered body in an outer package formed of a laminate film, pressurizing the all solid state battery layered body stored in the outer package from outside the outer package in a layering direction, injecting a filler into the outer package while maintaining the pressure, and sealing the outer package.

CITATION LIST

Patent Literature

Patent Literature 1: Japanese Patent Application Laid-Open (JP-A) No. 2018-133175

SUMMARY OF DISCLOSURE

Technical Problem

When producing a laminate battery, first, an outer package is arranged to cover the surrounding of an internal element, and then the internal element is sealed by the outer package under a reduced pressure atmosphere. On the occasion of sealing under the reduced pressure atmosphere, wrinkles (not intended) may be generated in the outer package.

The present disclosure has been made in view of the above circumstances and a main object thereof is to provide a battery in which wrinkles in its outer package is prevented from generating.

Solution to Problem

The present disclosure provides a battery including: an internal element including at least a power generating element, and a laminate-type outer package in which the internal element is sealed; wherein the internal element includes a groove structure; and the battery includes a storing part where a part of the outer package is stored in the groove structure.

According to the present disclosure, when the internal element includes the groove structure, and further when the battery includes a storing part where a part of the outer package is stored in the groove structure, wrinkles in the outer package is prevented from generating.

In the disclosure, the internal element may include a binding member arranged in a side surface of the power generating element; and the groove structure may be formed in the binding member.

In the disclosure, the internal element may include a protecting member that protects at least one of a current collecting tab and a current collecting terminal; and the groove structure may be formed in the protecting member.

The present disclosure also provides a method for producing a battery that includes an internal element including at least a power generating element, and a laminate-type outer package in which the internal element is sealed, the method comprising: an arranging step of arranging the outer package to cover surrounding of the internal element; and a sealing step of sealing the internal element by the outer package under a reduced pressure atmosphere, after the arranging step; wherein the internal element includes a groove structure; and the sealing step includes forming of a storing part where a part of the outer package is stored in the groove structure.

According to the present disclosure, when the internal element including the groove structure is used and a part of the outer package is stored in the groove structure, wrinkles in the outer package is prevented from generating.

Effects of Disclosure

The present disclosure exhibits an effect of providing a battery in which wrinkles in its outer package is prevented from generating.

BRIEF DESCRIPTION OF DRAWINGS

FIG. 8A is a schematic side view exemplifying the binding member in the present disclosure.

FIG. 8B is a schematic cross-sectional view exemplifying the binding member in the present disclosure.

FIG. 9A is a schematic cross-sectional view exemplifying the binding member in the present disclosure.

FIG. 9B is another schematic cross-sectional view exemplifying the binding member in the present disclosure.

FIG. 10 is a schematic cross-sectional view exemplifying the binding member in the present disclosure.

FIG. 11A is a schematic perspective view exemplifying the protecting member in the present disclosure.

FIG. 11B is a schematic side view exemplifying the protecting member in the present disclosure.

FIG. 12 is a schematic perspective view exemplifying the protecting member in the present disclosure.

FIG. 13 is a schematic cross-sectional view exemplifying the power generating element in the present disclosure.

FIG. 14A is a schematic cross-sectional view exemplifying the outer package in the present disclosure.

FIG. 14B is another schematic cross-sectional view exemplifying the outer package and the internal element in the present disclosure.

FIG. 15A is a schematic cross-sectional view exemplifying the outer package in the present disclosure.

FIG. 15B is a schematic cross-sectional view exemplifying two outer packages and the internal element in the present disclosure.

FIG. 16A is a schematic cross-sectional view exemplifying the method for producing the battery in the present disclosure.

FIG. 16B is a schematic cross-sectional view exemplifying the method in which the outer packages are heat-sealed a reduced pressure atmosphere to form a sealing and the internal element is sealed for producing the battery in the present disclosure.

DESCRIPTION OF EMBODIMENTS

The outer package and the battery in the present disclosure will be hereinafter explained in details. Each drawing described as below is a schematic view, and the size and the shape of each portion are appropriately exaggerated in order to be understood easily. Further, in each drawing, hatchings or reference signs are appropriately omitted.

A. Battery

Figure 1:
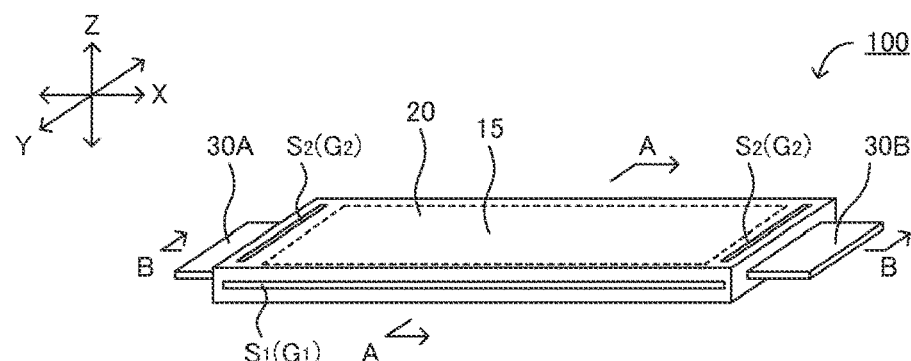
FIG. 1 is a schematic perspective view exemplifying the battery in the present disclosure.

FIG. 1 is a schematic perspective view exemplifying the battery in the present disclosure. As shown in FIG. 1, battery 100 includes: internal element 15, laminate-type outer package 20 in which the internal element 15 is sealed, cathode terminal 30A connected to a cathode tab (not illustrated) in the internal element 15, and anode terminal 30B connected to an anode tab (not illustrated) in the internal element 15.

Figure 2A:
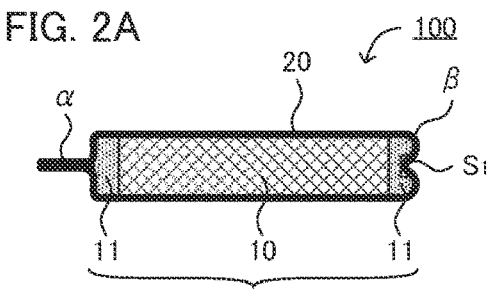
FIG. 2A is a cross-sectional view of A-A in FIG. 1.
Figure 2B:
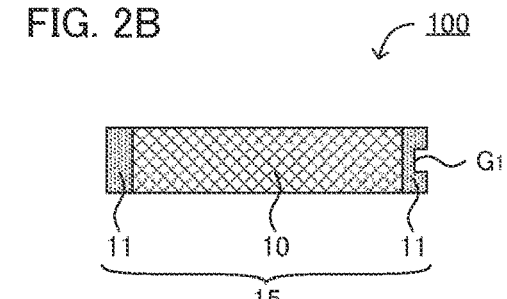
FIG. 2B is a cross-sectional view of A-A in FIG. 1 omitting the outer package.

FIG. 2A is a cross-sectional view of A-A in FIG. 1, and FIG. 2B is the view omitting the outer package 20 in FIG. 2A. As shown in FIGS. 2A and 2B, the internal element 15 includes: power generating element 10, and binding member 11 arranged in the side surface of the power generating element 10. As shown in FIG. 2B, groove structure $G_1$ is formed in the binding member 11 in the internal element 15, and as shown in FIG. 2A, battery 100 includes storing part $S_1$ where a part of the outer package 20 is stored in the groove structure $G_1$.

Figure 3A:
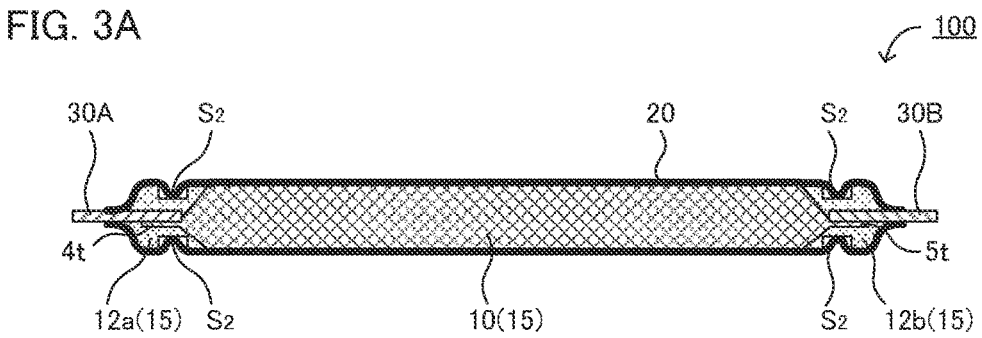
FIG. 3A is a cross-sectional view of B-B in FIG. 1.
Figure 3B:
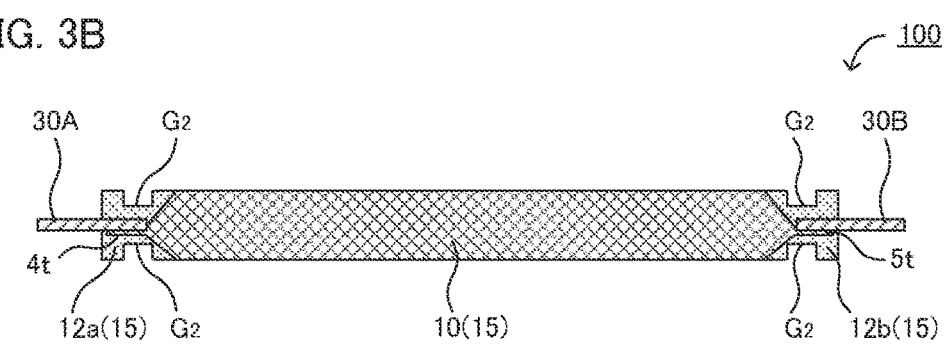
FIG. 3B is a cross-sectional view of B-B in FIG. 1 omitting the outer package.

FIG. 3A is a cross-sectional view of B-B in FIG. 1, and FIG. 3B is the view omitting the outer package 20 in FIG. 3A. As shown in FIGS. 3A and 3B, internal element 15 includes: protecting member 12a that protects a connecting part of cathode tab 4t and cathode terminal 30A; and protecting member 12b that protects a connecting part of anode tab 5t and anode terminal 30B. As shown in FIG. 3B, groove structure $G_2$ is formed in each of the protecting members 12a and 12b in the internal element 15, and as shown in FIG. 3A, battery 100 includes storing part $S_2$ where a part of the outer package 20 is stored in the groove structure $G_2$.

According to the present disclosure, when the internal element includes the groove structure, and further when the battery includes a storing part where a part of the outer package is stored in the groove structure, wrinkles in the outer package is prevented from generating. As described above, when producing a laminate battery, first, an outer package is arranged to cover the surrounding of an internal element, and then the internal element is sealed by the outer package under a reduced pressure atmosphere. On the occasion of sealing under a reduced pressure atmosphere, wrinkles may be generated in the outer package.

For example, a battery using an outer package including a cup part is usually produced in the manner such that an internal element is arranged in the cup part, and then the outer package is arranged to cover the surrounding of the internal element, and the internal element is sealed by the outer package under a reduced pressure atmosphere. From the view point of improving the energy density, there is ideally no space between the internal element and the cup part. In real, there need to be a little space between the two by designing the cup part larger than the internal element, in consideration of nonuniformity of the size of the internal element and expansion and contraction of the internal element. If there is a little space, not intended wrinkles may be generated in the outer package due to the space, when sealing under a reduced pressure atmosphere.

In contrast, when the internal element includes a groove structure, and further when the battery includes a storing part where a part of the outer package is stored in the groove structure, wrinkles may be prevented from generating in the outer package. For this reason, breakage of the outer package over time caused by wrinkles may be inhibited, and maintenance of sealability for a long period of time is possible. Also, if stress is accumulated in the wrinkles of the outer package along with expansion and contraction of the power generating element, breakage of the outer package may occur. In contrast, in the battery of the present disclosure, wrinkles are prevented from generating in the outer package, and thus the breakage of the outer package due to the accumulation of stress may be inhibited.

Figure 4A:
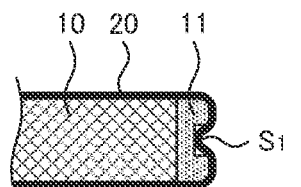
FIG. 4A is a schematic cross-sectional view explaining the effect of the present disclosure.
Figure 4B:
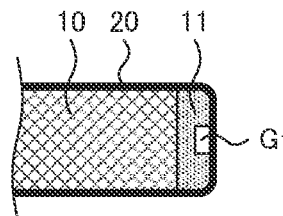
FIG. 4B is a schematic cross-sectional view explaining the effect of the present disclosure when a part of the outer package stored in a groove structure extends.
Figure 5A:
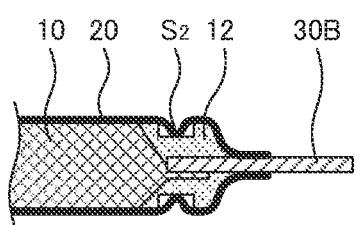
FIG. 5A is a schematic cross-sectional view explaining the effect of the present disclosure.
Figure 5B:
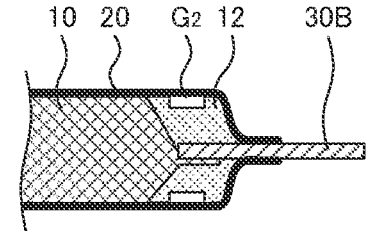
FIG. 5B is a schematic cross-sectional view explaining the effect of the present disclosure when the part of outer package stored in a groove structure extends.

Further, since the storing part in the present disclosure works as a stress mitigating part, the breakage of the outer package along with the expansion and contraction of the power generating element may be inhibited. Here, FIG. 4A and FIG. 5A are each enlarged views of FIG. 2A and FIG. 3A partially. Storing parts $S_1$ and $S_2$ shown in FIG. 4A and FIG. 5A work as a stress mitigating part when the power generating element expands. In specific, as shown in FIG. 4B and FIG. 5B, when a part of outer package 20 stored in groove structures $G_1$ and $G_2$ extends, generation of stress during expansion of the power generating element may be mitigated.

1. Internal Element

The internal element in the present disclosure includes at least a power generating element. The internal element may further include at least one of a binding member and a protecting member, other than the power generating element. Also, the internal element in the present disclosure includes a groove structure. In the present disclosure, the binding member may include the groove structure, the protecting member may include the groove structure, and the power generating element may include the groove structure. Also, a member (such as a spacer) other than the binding member, the protecting member, and the power generating element may include the groove structure.

(1) Groove Structure

Figure 6A:
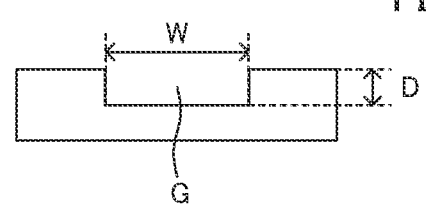
FIG. 6A is a schematic cross-sectional view exemplifying the groove structure having a square shape in the present disclosure.

The groove structure in the present disclosure is a structure formed in the internal element, and the cross-section of the structure is in a concave shape. Here, the cross-section of the structure refers to a cross-section of the groove structure when it is cut in a plane surface orthogonal to the direction the groove structure extends to. As shown in FIG. 6A, D designates the depth of groove structure G, and W designates the width of the groove structure G. Also, although not particularly illustrated, the thickness of the outer package is regarded as T. The rate (D/T) of D with respect to T is, for example, 1.5 or more, may be 2 or more, and may be 3 or more. Meanwhile, D/T is, for example, 6 or less, may be 5 or less, and may be 4 or less. Also, the rate (W/T) of W with respect to T is, for example, 2 or more, may be 4 or more, and may be 6 or more. Meanwhile, W/T is, for example, 12 or less, may be 10 or less, and may be 8 or less.

Figure 6B:
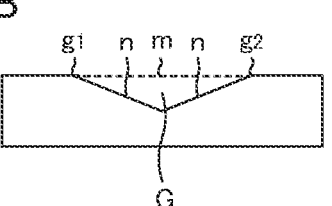
FIG. 6B is another schematic cross-sectional view exemplifying the groove structure having a triangular shape.

Also, as shown in FIG. 6B, one end of the groove structure G is regarded as $g_1$, and the other end is regarded as $g_2$. The end $g_1$ and the end $g_2$ are boundaries between the groove structure and the other parts. Also, a cross-sectional shape of the groove structure G refers to a closed section of the groove structure G specified by straight line "m" connecting the end $g_1$ and the end $g_2$, and side "n" configuring the groove structure G. The cross-sectional shape of the groove structure G may be, as shown in FIG. 6B, in a triangle. Meanwhile, as shown in FIG. 6A, the cross-sectional shape of the groove structure G may be in a square. Also, the side "n" configuring the groove structure G may be a straight line, and may be a curve line. Specific examples of the case where the side "n" configuring the groove G is a curve line may include a side "n" in a circular arc. In some embodiments, the length of the total of the side "n" configuring the groove G is designed based on nonuniformity of the size of the internal element (the maximum value of the difference between the size when designing the element and the size when producing the element), and size change along with expansion and contraction of the internal element (the maximum value of the difference between the size when the element expands the most, and the size when the element contracts the most). Further, some margin may be given.

Figure 7A:
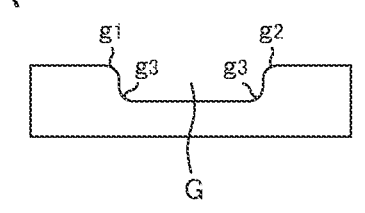
FIG. 7A is a schematic cross-sectional view exemplifying the groove structure in the present disclosure.
Figure 7B:
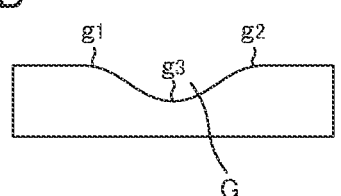
FIG. 7B is another schematic cross-sectional view exemplifying the groove structure in the present disclosure.

In some embodiments, at least one of the end $g_1$ and the end $g_2$ of the groove structure G is in R shape. The reason therefor is to inhibit the breakage of the outer package. For example, end $g_1$ and end $g_2$ shown in FIGS. 7A and 7B are in R shape. In some embodiments, top $g_3$, where two of the side "n" are connected, is in R shape. The reason therefor is to inhibit the breakage of the outer package. For example, top $g_3$ shown in FIGS. 7A and 7B is respectively in R shape.

There are no particular limitations on a direction to which the groove structure G extends. Here, as shown in FIG. 1, a thickness direction of the battery 100 is defined as Z axis direction. Further, a direction that is orthogonal to the Z axis direction and that also corresponds to a longer direction of the battery 100, is defined as X axis direction. Also, a direction orthogonal to the Z axis direction and the X axis direction is defined as Y axis direction. The Y axis direction is, for example, a direction corresponding to a shorter direction of the battery 100.

The direction to which the groove structure G extends may be parallel to the X axis direction, may be parallel to the Y axis direction, and may be parallel to the Z axis direction. "Parallel" in the present disclosure means that the angle formed of two directions is 0° or more and 30° or less. The angle may be, 15° or less, and may be 5° or less. For example, the direction to which the groove structure $G_1$ shown in FIG. 1 extends is parallel to the X axis direction. Also, the direction to which the groove structure $G_2$ shown in FIG. 1 extends is parallel to the Y axis direction. Also, the direction to which the storing part S extends is basically the same as the direction to which the groove structure G extends. Also, the direction to which the groove structure G extends may not be parallel to any of the X axis direction, the Y axis direction, and the Z axis direction. The length of the groove structure G in its extending direction with respect to the length of the battery in its extending direction is, for example, 30% or more, may be 50% or more, and may be 70% or more.

Also, as shown in FIG. 6B, the straight line "m" is a straight line connecting the end $g_1$ and the end $g_2$ of the groove structure G. The straight line "m" may be parallel to the X axis direction, may be parallel to the Y axis direction, and may be parallel to the Z axis direction. For example, in the groove structure $G_1$ shown in FIG. 1, the straight line "m" (not illustrated) is parallel to the Z axis direction. Also, in the groove structure $G_2$ shown in FIG. 1, the straight line "m" (not illustrated) is parallel to the X axis direction.

(2) Binding Member

The binding member in the present disclosure is a member arranged in the side surface of the power generating element. Arrangement of the binding member prevents each layer configuring the power generating element from misaligning. There are no particular limitations on materials of the binding member, and examples thereof may include a resin.

FIG. 8A is a schematic side view exemplifying the binding member in the present disclosure, and FIG. 8B is a cross-sectional view of A-A in FIG. 8A. As shown in FIGS. 8A and 8B, internal element 15 includes binding member 11 arranged in the side surface of power generating element 10. Also, as shown in FIGS. 8A and 8B, groove structure G is formed in the binding member 11. The direction to which the groove structure G extends may be parallel to the longer direction of the binding member 11 in a plan view.

$D_A$ designates the direction of straight line "m" connecting end $g_1$ and end $g_2$ of the groove structure G. The direction $D_A$ in the groove structure G shown in FIG. 8B is parallel to the thickness direction of the battery. Also, the internal element 15 shown in FIG. 8B includes binding member 11 in each of one side surface of the power generating element 10 and the other side surface of the power generating element 10. In FIG. 8B, the groove structure G is formed in just one out of two binding member 11, but the groove structure G may be formed in both of the two binding member 11.

Also, as shown in FIG. 9A, a plurality of groove structure G may be formed in binding member 11. In FIG. 9A, the direction to which the plurality of groove structure G extends is parallel to the longer direction of the binding member 11 in a plan view, and the direction $D_A$ in the plurality of groove structure G is parallel to the thickness direction of the battery. Also, in FIG. 9B, the direction to which the plurality of groove structure G extends is parallel to the longer direction of the binding member 11 in a plan view, and the direction $D_A$ in the plurality of groove structure G is vertical to the thickness direction of the battery. "Vertical" in the present disclosure means that the angle formed of two directions is 60° or more and 90° or less. The angle may be 75° or more, and may be 85° or more.

Also, as shown in FIGS. 2A and 2B, the groove structure G may be formed in the binding member 11 positioned in bending part β side of the outer package 20. Similarly, the groove structure G may not be formed in the binding member 11 positioned in sealing part α side of the outer package 20. Also, as shown in FIG. 10, groove structure G may be formed in binding member 11 positioned in sealing part α side of outer package 20. In some embodiments, the position of the groove structure G is not overlapping the position of sealing surface P of the sealing part α in the thickness direction of the battery. The reason therefor is to inhibit breakage of the sealing part α. Incidentally, when the sealing part α is sufficiently firm, the position of the groove structure G may overlap the position of the sealing surface P of the sealing part α in the thickness direction of the battery.

(3) Protecting Member

The protecting member in the present disclosure is a member that protects at least one of the current collecting tab and the current collecting terminal. The current collecting tab generally refers to a cathode tab and an anode tab, and the current collecting terminal generally refers to a cathode terminal and an anode terminal. Also, at least one of the current collecting tab and the current collecting terminal may be generally referred to as a current collecting member. In some embodiments, the protecting member is a member that protects both of the current collecting tab and the current collecting terminal. In some embodiments, the protecting member is a member that protects a connecting part where the current collecting tab and the current collecting terminal are connected. Arrangement of the protecting member prevents breakage of at least one of the current collecting tab and the current collecting terminal. There are no particular limitations on materials of the protecting member, and examples thereof may include a resin.

FIG. 11A is a schematic perspective view exemplifying the protecting member in the present disclosure, and FIG. 11B is a schematic side view of the protecting member in FIG. 11A observed from the arrow mark. The protecting member 12 shown in FIGS. 11A and 11B includes penetrating part 121 where a current collecting member (not illustrated) can be inserted. With the penetrating part 121, the current collecting member (not illustrated) may be protected from shocks of the Z axis direction and the Y axis direction in FIG. 1. Also, as shown in FIGS. 11A and 11B, groove structure G is formed in the protecting member 12. The direction to which the groove structure G extends may be parallel to the longer direction of the protecting member 12 in a plan view.

Also, as shown in FIGS. 11A and 11B, a plurality of groove structure G may be formed in the protecting member 12. Meanwhile, although not illustrated, just one the groove structure G may be formed in the protecting member 12. In FIGS. 11A and 11B, the direction to which the plurality of groove structure G extends is parallel to the longer direction of the protecting member 12 in a plan view, and the direction $D_A$ in the plurality of groove structure G is parallel to the shorter direction of the protecting member 12 in a plan view.

Also, as shown in FIG. 12, the protecting member 12 may be divided into two, along with a surface crossing to the direction of the battery. In other words, the protecting member 12 may include a pair of members: a first member 12a and a second member 12b. In each of the first member 12a and the second member 12b shown in FIG. 12, cutout part 122 is formed so that the current collecting member may be arranged. Incidentally, the first member 12a and the second member 12b may not include the cutout part 122.

(4) Power Generating Element

The power generating element in the present disclosure includes at least a power generating unit that includes a cathode current collector, a cathode active material layer, an electrolyte layer, an anode active material layer and an anode current collector. For example, power generating element 10 shown in FIG. 13 includes power generating unit U, and in the power generating unit U, along with the thickness direction, layers are arranged in the order of: cathode current collector 1, cathode active material layer 2, electrolyte layer 3, anode active material layer 4 and anode current collector 5. Also, the power generating element 10 shown in FIG. 13 includes four of the power generating unit U, and each of the power generating unit U is connected in parallel. In specific, cathode tab it in each of the power generating unit U is connected, and anode tab 5t in each of the power generating unit U is also connected. In this manner, four of the power generating unit U are connected in parallel.

The cathode active material layer contains at least a cathode active material, and may further contain at least one of a conductive material, an electrolyte and a binder. Examples of the cathode active material may include an oxide active material such as $LiNi_{1/3}Mn_{1/3}Co_{1/3}O_2$. Examples of the conductive material may include a carbon material. Examples of the electrolyte may include an electrolyte solution (liquid electrolyte) and a solid electrolyte. Examples of the liquid electrolyte may include a liquid electrolyte in which Li salt such as $LiPF_6$ is dissolved in a carbonate-based solvent. Meanwhile, examples of the solid electrolyte may include an inorganic solid electrolyte such as a sulfide solid electrolyte, an oxide solid electrolyte, and a halide solid electrolyte; and a gel electrolyte and a polymer electrolyte. Examples of the binder may include a fluorine-based binder such as PVDF. Examples of the cathode current collector may include Al, SUS and Ni. Also, the cathode current collector usually includes a cathode tab configured to connect to a cathode terminal.

The anode active material layer contains at least an anode active material, and may further contain at least one of a conductive material, an electrolyte and a binder. Examples of the anode active material may include a Si-based active material such as a simple substance of Si, a Si alloy and a Si oxide; a graphite-based active material such as graphite; and an oxide-based active material such as lithium titanate. The Si-based active material may easily cause breakage of the outer package since its volume change during charge and discharge is large; however, the breakage of the outer package may be inhibited by using the above described outer package. The conductive material, the electrolyte and the binder to be used in the anode active material layer are in the same contents as those described for the cathode active material layer above. Examples of the anode current collector may include Cu, SUS and Ni. Also, the anode current collector usually includes an anode tab configured to connect to an anode terminal.

The electrolyte layer contains at least an electrolyte, and may further contain a binder. The electrolyte and the binder are in the same contents as those described for the cathode active material layer above. When the electrolyte layer contains an electrolyte solution, the electrolyte layer may be a layer formed by impregnating the electrolyte solution to a separator. When the electrolyte layer contains a solid electrolyte, such a battery is generally called an all solid state battery. The battery in the present disclosure may be the all solid state battery.

When the power generating element includes a plurality of the power generating unit, they may be connected in series and may be connected in parallel. When a plurality of the power generating unit are connected in series, in the neighboring power generating units U, the cathode current collector in one power generating unit U and the anode current collector in the other power generating unit U may be shared. When the plurality of the power generating unit are connected in parallel, in the neighboring power generating units U, the cathode current collector in one power generating unit U and the cathode current collector in the other power generating unit U may be shared. Similarly, in the neighboring power generating units U, the anode current collector in one power generating unit U and the anode current collector in the other power generating unit U may be shared.

2. Outer Package

The outer package in the present disclosure is a member configured to seal the internal element. In some embodiments, the outer package includes a cup part where the internal element may be arranged. For example, outer package 20 shown in FIG. 14A includes a pair of cup parts 21a and 21b, connecting part 22 arranged between the pair of the cup parts 21a and 21b, flange part 23a connected to an end positioned in the opposite side to the connecting part 22 of the cup part 21a, and flange part 23b connected to an end positioned in the opposite side to the connecting part 22 of the cup part 21b. Although not particularly illustrated, the connecting part 22 may include a protrusion. On the occasion of sealing the internal element by the outer package, misaligning of the outer package and the internal element may be inhibited by arranging the protrusion of the outer package in the groove structure of the internal element.

As shown in FIG. 14B, the internal element 15 is arranged in the cup part 21a of the outer package 20, and then the outer package 20 is folded so that the flange part 23a and the flange part 23b face to each other. Thereby, the outer package 20 is arranged to cover the surrounding of the internal element 15. Also, as shown in FIG. 14B, $W_1$ designates the width of the cup part 21, and $W_2$ designates the width of the internal element 15. In some embodiments, $W_1$ is larger than $W_2$. The reason therefor is such that the size of the internal element is usually not the same, but even in such a case, the internal element may be stably arranged in the cup part.

On the other hand, if $W_1$ is larger than $W_2$, there would be extra length of the outer package, and thus wrinkles would be easily generated in the outer package due to the reduced pressure atmosphere on the occasion of sealing the internal element by the outer package. In contrast, the internal element in the present disclosure includes the groove structure, and the extra length of the outer package may be stored in the groove structure; thus, the wrinkles may be prevented from generating in the outer package. The rate of $W_2$ with respect to $W_1$, which is $W_1/W_2$ is not particularly limited; for example, it is 1.05 or more.

Also, as shown in FIGS. 14A and 14B, outer package 20 may include two cup parts. Meanwhile, as shown in FIGS. 15A and 15B, outer package 20 may include just one cup part. For example, the outer package 20 shown in FIG. 15A includes cup part 21, flange part 23a connected to one end of the cup part 21, and flange part 23b connected to the other end of the cup part 21. As shown in FIG. 15B, two outer packages 20 are prepared, internal element 15 is arranged in the cup part 21 of one outer package 20, and then the internal element 15 is covered by the cup part 21 of the other outer package 20. Thereby, the outer package 20 is arranged to cover the surrounding of the internal element 15.

There are no particular limitations on the shape of the outer periphery of the outer package in a plan view, and examples thereof may include a square shape such as four square and rectangular. When the shape of the outer package in a plan view is in a rectangular, the current collecting terminal may be arranged in the longer side of the rectangular, and may be arranged in the shorter side of the rectangular. Also, the cathode terminal and the anode terminal may be each arranged in the same side, and may be each arranged in the sides opposing to each other. In some embodiments, when the shape of the outer package in a plan view is in a rectangular, the direction to which the groove structure G extends in the present disclosure is parallel to the longer side or the shorter side of the rectangular in a plan view.

The outer package in the present disclosure is a laminate-type outer package. The laminate-type outer package includes at least a structure in which a thermally weldable layer and a metal layer are laminated. Also, the outer package may include, along with the thickness direction, layers in the order of: a thermally weldable layer, a metal layer and a resin layer. Examples of the materials of the thermally weldable layer may include an olefin-based resin such as polypropylene (PP) and polyethylene (PE). Examples of the material of the metal layer may include aluminum, an aluminum alloy, and stainless steel. Examples of the materials of the resin layer may include polyethylene terephthalate (PET) and nylon. The thickness of the thermally weldable layer is, for example, 40 μm or more and 100 μm or less. The thickness of the metal layer is, for example, 30 μm or more and 60 μm or less. The thickness of the resin layer is, for example, 20 μm or more and 60 μm or less. The thickness of the outer package is, for example, 80 μm or more and 250 μm or less.

The method for producing the outer package in the present disclosure is not particularly limited, and examples thereof may include a production method including an emboss processing step of conducting an emboss processing (flange processing) to a laminate film to form the cup part. In the emboss processing, usually, the laminate film is arranged between a male mold and a female mold and pressed therewith to form the cup part. The shape corresponding to the cup part is formed in each of the male mold and the female mold. There are no particular limitations on the conditions for pressing, and usual conditions may be adopted.

3. Battery

The battery in the present disclosure includes the above described internal element and outer package. Also, the battery in the present disclosure includes a storing part where a part of the outer package is stored in the groove structure. "A part of the outer package is stored in the groove structure" means that, when "m" designates a straight line connecting end $g_1$ and end $g_2$ of the groove structure, a part of the outer package is positioned in the side closer to the groove structure than the straight line "m". For example, as shown in FIG. 6B, when "m" designates a straight line connecting the end $g_1$ and the end $g_2$ of the groove structure, and when a part of the outer package (not illustrated) is positioned in the side closer to the groove structure G than the straight line "m", the battery is determined to include the storing part. Also, $D_S$ designates the depth of the storing part, and D designates the depth of the groove structure. The rate of $D_S$ with respect to D, which is $D_S/D$ is, for example, 0.5 or more and may be 0.75 or more. Also, the storing part may contact the deepest bottom part of the groove structure.

Also, the battery in the present disclosure usually includes a cathode terminal and an anode terminal. One end of the cathode terminal is connected to the cathode tab in an internal space of the outer package, and the other end is exposed from the outer package. Similarly, one end of the anode terminal is connected to the anode tab in an internal space of the outer package, and the other end is exposed from the outer package. Also, the battery in the present disclosure is typically a lithium ion secondary battery.

B. Method for Producing Battery

Figures 16A, 16B:
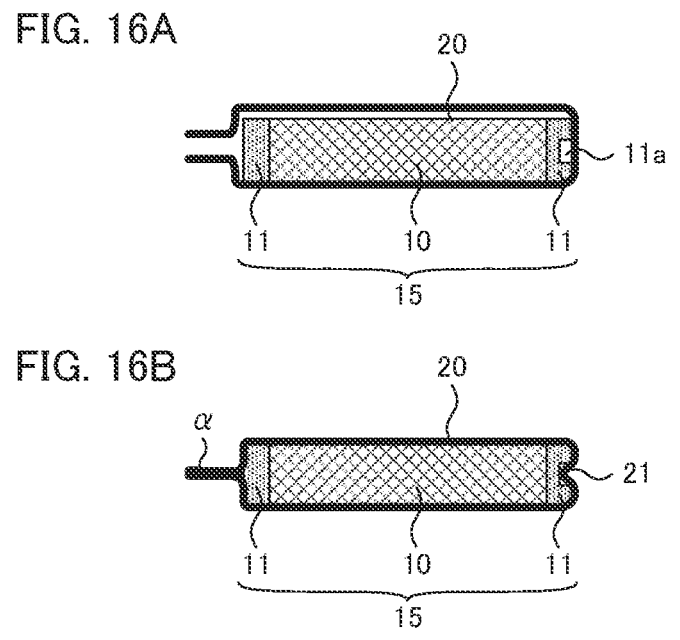

FIGS. 16A and 16B are schematic cross-sectional views exemplifying the method for producing the battery in the present disclosure. First, as shown in FIG. 16A, internal element 15 including power generating element 10, and binding member 11 that is arranged in the side surface of the power generating element 11, and that includes groove structure 11a, is prepared. Further, outer package 20 is arranged to cover the surrounding of the internal element 15. In this stage, the internal element 15 is in the state not sealed by the outer package 20. Next, as shown in FIG. 16B, the outer package 20 facing to each other are heat-sealed under a reduced pressure atmosphere to form sealing part α, and the internal element 15 is sealed. Under the reduced pressure atmosphere, force of the groove structure 11a and the outer package 20 approaching to each other works so that there will be no space between the groove structure 11a and the outer package 20. Thereby, the storing part 21 where a part of the outer package 20 is stored in the groove structure 11a is formed.

According to the present disclosure, when the internal element including the groove structure is used and a part of the outer package is stored in the groove structure, wrinkles in the outer package is prevented from generating.

1. Arranging Step

The arranging step in the present disclosure is a step of arranging the outer package to cover the surrounding of the internal element. The internal element and the outer package are in the same contents as those described in "A. Battery" above; thus, the descriptions herein are omitted. In some embodiments, the internal element is arranged in the cup part of the outer package. In some embodiments, the cathode tab and the anode tab in the internal element are respectively connected to the cathode terminal and the anode terminal.

2. Sealing Step

The sealing step in the present disclosure is a step of sealing the internal element by the outer package under a reduced pressure atmosphere, after the arranging step. In some embodiments, the sealing part is formed in the manner such that the outer package facing to each other is heat-sealed by measures such as a heat bar, while removing the air between the internal element and the outer package under the reduced pressure atmosphere.

3. Battery

The battery to be obtained by each of the aforementioned step is in the same contents as those described in "A. Battery" above; thus, the descriptions herein are omitted.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST 1 cathode current collector
2 cathode active material layer
3 electrolyte layer
4 anode active material layer
5 anode current collector
10 power generating element 11 binding member
12 protecting member
20 outer package
30A cathode terminal
30B anode terminal
100 battery

What is claimed is:

1. A battery comprising:
an internal element including at least a power generating element, and a laminate-type outer package in which the internal element is sealed;
a cathode terminal extending away from the power generating element along an axis; and an anode terminal extending away from the power generating element along the axis opposite the cathode terminal; wherein:
the internal element includes a binding member arranged on a side surface of the power generating element;
the internal element includes a groove structure, the groove structure extends parallel to the axis, the groove structure is formed in the binding member, and the groove structure is formed in a side surface of the binding member that faces a same direction as the side surface of the of the power generating element; and
the battery includes a storing part where a part of the outer package is stored in the groove structure.

2. The battery according to claim 1, wherein the internal element includes a protecting member that protects at least one of a current collecting tab and a current collecting terminal; and the groove structure is formed in the protecting member.

3. The battery according to claim 1, further comprising a second groove structure extending parallel to a second axis that is perpendicular to the axis, a part of the outer package stored in the second grove structure.

4. The battery according to claim 3, further comprising another second groove structure extending parallel to the second axis, a part of the outer package stored in the another second groove structure.

5. The battery according to claim 4, wherein the cathode terminal is between the second groove structure and the another second groove structure.

6. The battery according to claim 1, wherein the binding member abuts the side surface of the power generating element.

7. A method for producing a battery that includes an internal element including at least a power generating element, and a laminate-type outer package in which the internal element is sealed, the method comprising:
an arranging step of arranging the outer package to cover a surrounding of the internal element; and
a sealing step of sealing the internal element by the outer package under a reduced pressure atmosphere, after the arranging step; wherein
the battery includes a cathode terminal extending away from the power generating element along an axis and an anode terminal extending away from the power generating element along the axis opposite the cathode terminal;
the internal element includes a binding member arranged on a side surface of the power generating element;
the internal element includes a groove structure extending parallel to the axis, the groove structure is formed in the binding member, and the groove structure is formed in a side surface of the binding member that faces a same direction as the side surface of the of the power generating element; and

the sealing step includes forming of a storing part where
a part of the outer package is stored in the groove
structure.

8. The method according to claim 7, wherein the binding
member abuts the side surface of the power generating
element.

* * * * *